March 5, 1963  C. E. GUTSHALL  3,079,831
SCREW HAVING WORKPIECE DRILLING AND THREAD CUTTING POINT
Filed May 7, 1959  2 Sheets-Sheet 1
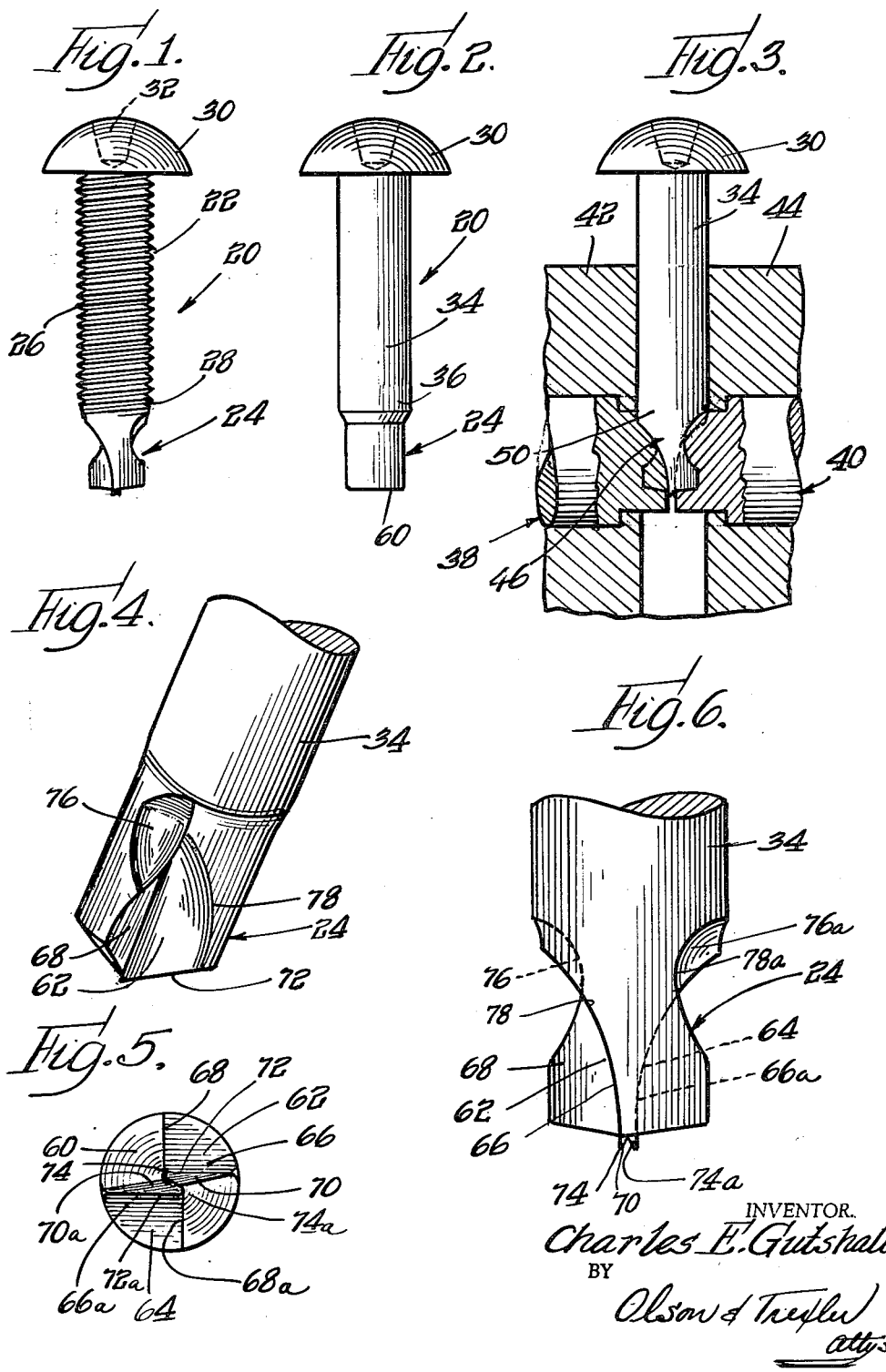
INVENTOR.
Charles E. Gutshall
BY
Olson & Trexler
attys.

March 5, 1963     C. E. GUTSHALL     3,079,831
SCREW HAVING WORKPIECE DRILLING AND THREAD CUTTING POINT
Filed May 7, 1959     2 Sheets-Sheet 2
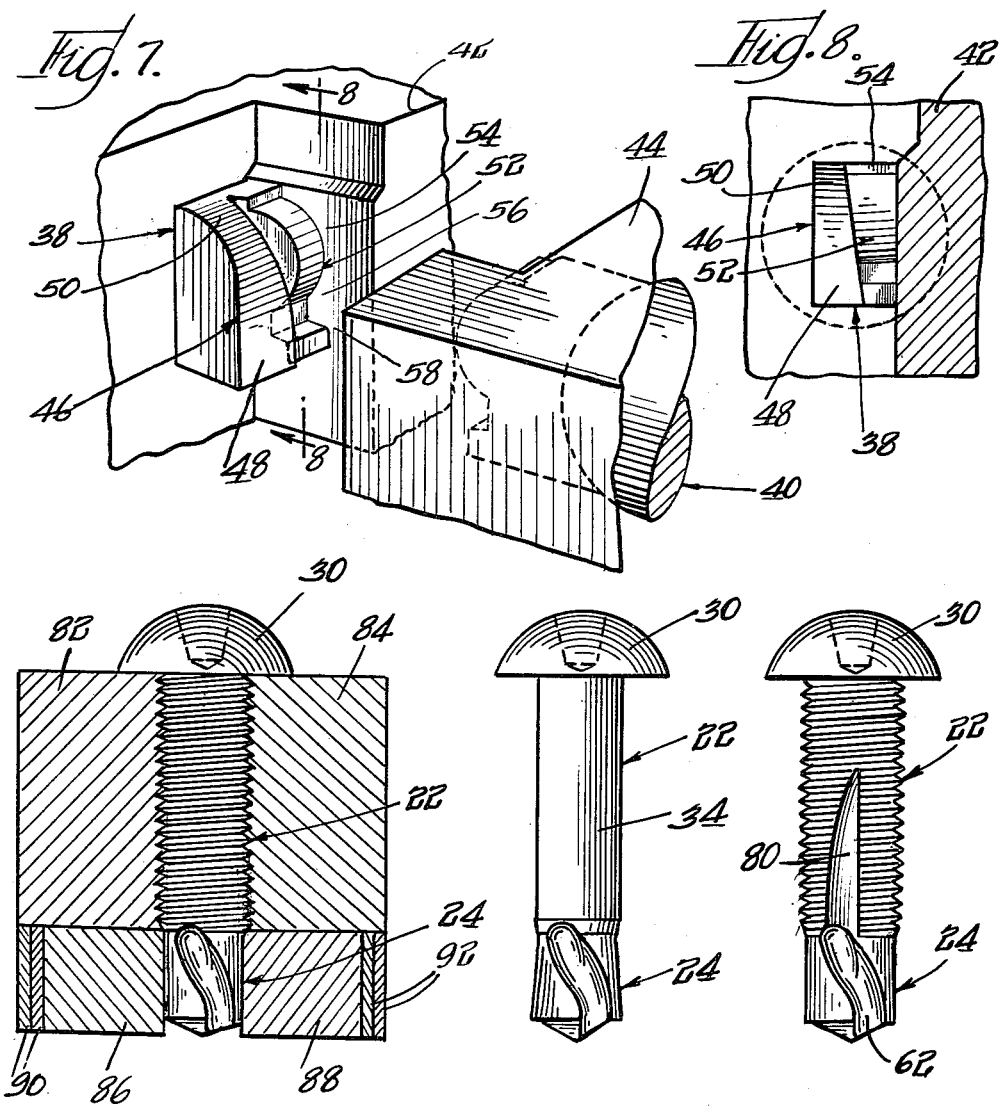
INVENTOR.
Charles E. Gutshall
BY
Olson & Trexler
attys.

United States Patent Office 3,079,831
Patented Mar. 5, 1963

3,079,831
SCREW HAVING WORKPIECE DRILLING AND THREAD CUTTING POINT
Charles E. Gutshall, Elgin, Ill., assignor to Illinois Tool Works, Inc., a corporation of Delaware
Filed May 7, 1959, Ser. No. 811,620
5 Claims. (Cl. 85—47)

This application relates to a novel threaded fastener, and more particularly to a novel screw.

An important object of the present invention is to provide a novel screw capable of drilling a hole in a blank workpiece in an effective manner so as to facilitate application of the screw to a workpiece.

A further object of the present invention is to provide a novel screw of the above described type and a method for producing the same whereby cutting edges are provided on the screw without the removal of any of the blank material for promoting the provision of a strong and effective workpiece cutting point on the screw.

Another object of the present invention is to provide a novel screw of the above described type and method for producing the same whereby an apertured drilling or cutting tip portion of the screw may readily be formed to various different diameters within limits imposed by the blank for adapting the screw for different applications.

Still another object of the present invention is to provide a novel workpiece drilling and thread cutting screw of the above described type which may be produced in an economical manner.

Other objects and advantages of the present invention will become apparent from the following description and the accompanying drawings wherein—

FIG. 1 is an elevational view showing a screw incorporating features of the present invention;

FIG. 2 is an elevational view showing a blank from which a screw incorporating features of the present invention may be formed;

FIG. 3 is a partial sectional view showing a first step in the method of forming the blank of FIG. 2 into a screw incorporating features of the present invention;

FIG. 4 is an enlarged fragmentary perspective view showing an entering end portion of the blank in a forged condition after the step shown in FIG. 3 has been accomplished;

FIG. 5 is an entering end view of the blank in the condition shown in FIG. 4;

FIG. 6 is an enlarged fragmentary elevational view showing the entering end portion of the blank;

FIG. 7 is an enlarged fragmentary perspective view showing die means operable for forging or swaging the entering end portion of the blank in accordance with the present invention;

FIG. 8 is a fragmentary perspective view taken generally along the line 8—8 in FIG. 7;

FIG. 9 is a side elevational view of the forged blank rotated 90° from the position shown in FIGS. 3 and 6;

FIG. 10 is a partial sectional view showing the manner in which a forged blank may be rolled between suitable die blocks for forming helical thread convolutions thereon and for controlling the diameter of the forged entering end portion thereof; and FIG. 11 is a side elevational view showing a finished screw constructed in accordance with the present invention and turned 90° from the position shown in FIG. 1.

Referring now more specifically to the drawings, wherein like parts are designated by the same numerals throughout the various figures, a screw 20 is shown in a finished condition in FIGS. 1, 10 and 11. The screw comprises an elongated shank 22 having an entering end portion 24 which is forged in the manner described in detail below so as to provide a workpiece cutting or drilling tip. Helical thread convolutions 26 are formed integrally with a trailing portion of the screw shank, and a part of these convolutions immediately adjacent the entering end portion or drilling tip 24 are of progressively decreasing height as illustrated at 28 so as to facilitate entry of the thread convolutions into an aperture drilled in a workpiece by the entering end portion 24. A head 30 is preferably provided at the trailing end of the screw shank, and suitable slot means 32 is provided in the head for cooperative engagement with a tool, not shown, which is to be used to turn the screw.

In accordance with the present invention the blank for the screw 20 is initially formed or extruded into the configuration shown in FIG. 2. In this initial condition, the blank preferably has a first diameter along its trailing section 34 on which the thread convolutions 26 are to be formed, a second smaller diameter along the entering end portion 24, and a progressively decreasing diameter along an intermediate section 36 on which the tapering thread convolutions 28 are to be formed.

After the blank is provided in the condition shown in FIG. 2, the entering end portion is pinched or cold forged between complementary dies 38 and 40 in the manner shown in FIG. 3 so as to provide the structural features described in detail below. The dies which are also shown in FIGS. 7 and 8, are respectively supported in blocks 42 and 44 adapted to be mounted in an apparatus of known construction having means for actuating the die elements 38 and 40 toward and away from each other so as to forge the screw blank.

The dies are identically formed but oppositely disposed for presenting first blank forming surfaces 46 for forming flutes in opposite sides of the entering end portion 24. Each of the surfaces 46 has a first portion 48 which is substantially straight and flat and inclined rearwardly and outwardly with respect to the longitudinal axis of the screw blank, and merging with a second portion 50 which may conveniently and economically be in the form of an arc of a circle. As indicated best in FIG. 8, each surface 46 progressively decreases in width from its straight section 48 through its arcuate section 50.

As indicated best in FIG. 7, each of the die elements also includes an undulated workpiece forming surface 52 having a bulging upper end portion 54 which projects substantially beyond the adjacent arcuate surface section 50. The portions 54 are adapted to engage the screw blank so as to prevent it from turning during the forging operation. The portions 54 also serve to form the blank in the manner described below so as to provide for additional chip clearance. As shown best in FIG. 7, a portion 56 of the surface 52 beneath the bulging portion 54 is curved rearwardly of the surface 46 and terminates in an outwardly or forwardly extending hook portion 58 which serves to confine a segment of a transverse end surface 60 of the blank so that other portions of the blank engaged by the adjacent surface portion 48 will be forged and extruded to provide a tip having the configuration described below.

Referring particularly to FIGS. 4, 5, 6 and 9, the entering end portion of the screw will now be described. When the screw blank is pinched or forged between the identical but oppositely disposed die elements 38 and 40, a pair of identical but oppositely disposed flutes 62 and 64 is provided in opposite sides of the entering portion 24. As shown in the drawings, each of the flutes is defined by a first surface 66 which is formed by and complementary to the die surface 46. In order to avoid duplication of description, the same reference numerals with the suffix "a" added are applied to the various surfaces and elements of the flute 64 as to the flute 62. During the forging operation a second surface 68 is formed substantially perpendicular to the surface 66. During the forging of the surface 66, a portion of the material which is displaced is extruded axially outwardly to provide a relatively thin rib 70 projecting beyond the normal position of the end surface 60 of the blank and presenting a cutting edge 72. Since a larger volume of material is displaced from a central portion of the shank than from radially outwardly disposed portions, the rib 70 and cutting edge 72 progressively increase in axial extent or projection from the periphery of the shank to the central axis thereof, or, in other words, the rib 70 is extruded or formed so that the cutting edge 72 extends generally radially and is inclined rearwardly from a point adjacent to but offset from the central axis of the screw. It is to be noted that the quarter of the end surface 60 between the flute surface 68 and the flute surface 66a is confined by the hooked surface portion 58 of the die element 38 so that the radially inner end of the rib 70 is sharply defined for providing a relatively sharp point 74 for facilitating initial entry of the screw into a blank workpiece. The quarter of the end surface 60 between the flute surfaces 66 and 68a is similarly confined by the die element 40 during the swaging operation so that the rib 70a is formed with a relatively sharp point 74a. It will be noted that the ribs 70 and 70a progressively increase in thickness from the cutting edges to the end surface 60 so as to provide well supported and strong cutting edges, and in addition these ribs extend so that they traverse a plane containing the central axis of the screw and are disposed parallel to the flute surfaces 68 and 68a so that the points 74 and 74a are located at opposite sides of this plane. In addition the ribs and thus the points are offset from each other and in opposite directions from a second plane containing the central axis of the screw and disposed parallel to the flute surfaces 66 and 66a. This arrangement of the points and the cutting edges facilitates starting of the screw into a blank workpiece and subsequent drilling of an aperture in the workpiece.

The flute surfaces 66 and 66a extend rearwardly from the tip cutting edges initially substantially in flat planes flaring slightly outwardly so as to provide for chip clearance and for directing the chips away from the cutting edges. Trailing portions of the surfaces 66 and 66a are curved outwardly in the manner shown so that the flutes progressively decrease in depth, but adjacent the curving portions of the surfaces 66 and 66a, recesses 76 and 76a are formed by the bulging surface portions 54 of the die elements. As indicated above, these recesses provide additional chip clearance.

The flute surfaces 66 and 66a extend rearwardly through the entering end portion 24 and also the intermediate portion 36 of the screw shank so that side cutting edges 78 and 78a provided at the intersection between the surfaces 66 and 66a and the periphery of the screw shank extend through the tapering thread convolutions 28. This provides the screw with means for forming or cutting complementary threads in a workpiece after an aperture has been drilled in the workpiece. In some instances it may be desirable to extend one or both of the side cutting edges rearwardly along the portion 34 of the shank, and this may be accomplished by sawing or otherwise forming a slot 80 in the shank as shown best in FIG. 11. However it is to be understood that in many instances the slot 80 may be omitted.

After the end portion of the screw blank has been forged in the manner described above, the blank is rolled between a pair of thread forming die blocks 82 and 84 shown in FIG. 10, which die blocks form the previously described thread convolutions 26 and 28. The die blocks 82 and 84 and the associated apparatus for rolling the screw blanks therebetween are of known construction and need not be described in detail. However it is to be noted that in accordance with a feature of the present invention, the entering end portion 24 of the screw blank may be worked upon during the thread rolling operation for controlling the diameter of the entering end portion and thus the diameter of an aperture which the screw will form in a workpiece. More specifically, a pair of sizing blocks 86 and 88 may be mounted beneath the thread forming dies as shown in FIG. 9 for reducing the diameter of the entering end portion when the screw blank is rolled therebetween. One or more shims 90 and 92 may be provided behind the sizing blocks in the manner indicated for positioning the blocks for reducing the diameter of the tip portion of the screw to various values. FIG. 11 indicates the manner in which the flute surfaces will be curled when the tip portion of the screw is rolled to reduce the diameter thereof.

While the preferred embodiment of the present invention has been shown and described herein, it is obvious that many structural details may be changed without departing from the spirit and scope of the appended claims.

The invention is claimed as follows:

1. A screw of the type described comprising an elongated shank, and means integral with a trailing end of the shank and interengageable with a tool for turning the screw, said shank comprising a forged entering end portion including a transversely disposed end surface, a plurality of symmetrically disposed thin ribs extruded axially from and projecting axially beyond said surface and respectively presenting points closely adjacent to and offset oppositely from a longitudinal axis of said shank and forged cutting edges extending generally radially and axially rearwardly from said points, said ribs and said cutting edges respectively extending generally parallel to and substantially on opposite sides of a first plane containing said longitudinal axis of the shank and traversing a second plane perpendicular to said first plane and containing said axis, said points being disposed at opposite sides of said second plane, said entering end portion being interrupted between said points for promoting independent engagement of the points with a work structure and thereby facilitate entry of the screw into a workpiece, said entering end portion having a plurality of flute means forged therein and respectively defined by first surfaces respectively flush with said cutting edges and extending rearwardly from said cutting edges, said surfaces intersecting the periphery of said entering end portion and providing side edges at said last mentioned intersections, and said shank including a plurality of helical thread convolutions extending rearwardly from said entering end portion.

2. A screw, as defined in claim 1, wherein each of said ribs includes a surface trailing its associated point and cutting edge and intersecting said first mentioned plane, the intersection between said plane and each of said trailing rib surfaces being substantially entirely axially rearwardly offset from said points.

3. A screw, as defined in claim 1, which includes recess means in said entering end portion circumferentially offset from and merging with trailing portions of the flute means for providing for chip clearance and for holding and positioning of the screw during forging of the entering end portion.

4. A screw, as defined in claim 1, wherein said surfaces defining said flute means are transversely curled.

5. A screw of the type described comprising an elongated shank, means integral with a trailing end of said shank and interengageable with a tool for turning the screw, said shank comprising a forged entering end portion including a pair of axially extruded points closely adjacent to and oppositely slightly offset from a longitudinal axis of said shank, said points being of substantially equal axial extent, said entering end portion including substantially straight edges respectively intersecting said points and extending generally radially and axially rearwardly therefrom substantially to the periphery of the shank, said edges respectively extending generally parallel to and substantially on opposite sides of a first plane containing said longitudinal axis of the shank and traversing a second plane perpendicular to said first plane and containing said axis, said points being disposed at opposite sides of said second plane, said entering end portion being forged for providing an interruption between said points for promoting independent engagement of the points with a work structure and thereby facilitating entry of the screw into a workpiece, and said shank including a plurality of helical thread convolutions extending rearwardly from said entering end portion.

References Cited in the file of this patent

UNITED STATES PATENTS

| | | |
|---|---|---|
| 1,235,604 | Royle | Aug. 7, 1917 |
| 1,361,858 | Hoeflich | Dec. 14, 1920 |
| 1,467,491 | Oliver | Sept. 11, 1923 |
| 1,508,268 | Brossoit | Sept. 9, 1924 |
| 1,698,951 | Holmes | Jan. 15, 1929 |
| 2,302,675 | Cherry | Nov. 24, 1942 |
| 2,479,730 | Dewar | Aug. 23, 1949 |
| 2,587,980 | Doepker | Mar. 8, 1952 |